US006443427B2

(12) United States Patent
Coupal

(10) Patent No.: US 6,443,427 B2
(45) Date of Patent: Sep. 3, 2002

(54) LOW-PROFILE LOW RESTRICTION DRAIN VALVE

(76) Inventor: André Coupal, 5730 8th Avenue, Rosemont, Quebec (CA), H1V 2L6

( * ) Notice: Subject to any disclaimer, the term of this patent is extended or adjusted under 35 U.S.C. 154(b) by 0 days.

(21) Appl. No.: 09/757,595

(22) Filed: Jan. 11, 2001

(30) Foreign Application Priority Data

Jan. 11, 2000 (CA) .................................. 2295187

(51) Int. Cl.[7] .............................................. F16K 31/44
(52) U.S. Cl. ......................... 251/351; 251/144; 184/1.5
(58) Field of Search ................................ 251/351, 349, 251/144; 184/1.5; 222/549, 552, 553

(56) References Cited

U.S. PATENT DOCUMENTS

| | | | | |
|---|---|---|---|---|
| 559,351 A | * | 5/1896 | Beal ........................... 222/552 |
| 627,073 A | | 6/1899 | Cliff |
| 1,264,718 A | * | 4/1918 | Wagner ....................... 251/351 |
| 2,474,430 A | | 6/1949 | Laue ............................ 137/34 |
| 2,985,180 A | * | 5/1961 | Grayson ..................... 251/351 |
| 3,103,341 A | * | 9/1963 | Moran ........................ 251/351 |
| 3,184,091 A | * | 5/1965 | Hoffman ..................... 251/351 |
| 3,727,638 A | | 4/1973 | Zaremba, Jr. et al. ...... 137/572 |
| 3,948,481 A | | 4/1976 | Pollock ....................... 251/351 |
| 4,025,048 A | | 5/1977 | Tibbitts ....................... 137/572 |
| 4,150,809 A | * | 4/1979 | Muller ........................ 251/144 |
| 4,351,355 A | * | 9/1982 | Koller et al. ............... 251/144 |
| 4,470,577 A | | 9/1984 | Warwick ..................... 251/351 |
| 4,807,847 A | * | 2/1989 | Martz ......................... 251/351 |
| 4,815,566 A | | 3/1989 | Caruso et al. .............. 184/1.5 |
| 5,067,689 A | * | 11/1991 | Phipps ........................ 251/144 |
| 5,176,215 A | | 1/1993 | Ackerman ................... 184/1.5 |
| 5,407,177 A | * | 4/1995 | Lombardo ................... 184/1.5 |
| 5,433,410 A | * | 7/1995 | Foltz ........................... 251/351 |
| 5,546,979 A | * | 8/1996 | Clark et al. ................. 184/1.5 |
| 5,579,815 A | * | 12/1996 | Labonte ....................... 251/351 |
| 5,667,195 A | * | 9/1997 | McCormick ................ 184/1.5 |
| 5,897,037 A | * | 4/1999 | Mann ........................... 222/549 |

* cited by examiner

*Primary Examiner*—Lesley D. Morris
*Assistant Examiner*—Eric Keasel
(74) *Attorney, Agent, or Firm*—Goudreau Gage Dubuc

(57) ABSTRACT

A substantially sputtering-free low-profile low-restriction drain valve is used with a fluid reservoir having a drain opening. The drain valve comprises a valve body, a cap and at least one perforation-sealing member. The valve body has a tubular shank installed in the drain opening and defining a fluid ingress, and a tubular head portion generally coaxial with the tubular shank and defining a chamber in communication with the fluid ingress and having a cross sectional area larger than a cross sectional area of the fluid ingress. The tubular head portion comprises an inner transverse wall extending across the chamber and comprising at least one fluid flow perforation, and a distal end opposite to the shank. The cap is movably assembled to the distal end of the tubular head portion between open and closed positions. This cap defines a fluid egress which, in the open position of the cap, is in communication with the perforation to permit draining of fluid from the reservoir. The perforation-sealing member is interposed between the cap and the tubular head portion and, in the closed position of the cap, seals the perforation to prevent draining of fluid from the reservoir. When the cap is in open position, fluid from the reservoir is drained through the ingress, chamber, perforation and egress. The perforation has a cross sectional area equal to or larger than a cross sectional area of the fluid ingress, while the egress has a cross sectional area equal to or larger than the cross sectional area of the perforation; this avoids leakage and a low restriction operation of the drain valve.

19 Claims, 4 Drawing Sheets

LOW-PROFILE LOW RESTRICTION DRAIN VALVE

BACKGROUND OF THE INVENTION

1. Field of the Invention

The present invention relates to a fluid drain valve.

More particularly, but not exclusively, the present invention relates to a low-profile low-restriction drain valve for use on fluid reservoirs to drain the reservoir content.

The drain valve of the present invention is particularly but not exclusively intended to replace drain plugs provided on the reservoirs of fluid lubricated, cooled or heated machines or components such as combustion engines, to facilitate fluid drainage and replacement.

2. Brief Description of the Prior Art

It is current practice for one of ordinary skill in the art of fluid handling to use a valve to extract fluid from a reservoir in order to properly direct this fluid into a collecting vessel, without splashing the attendant and the immediate periphery. However, there is still a number of fluid lubricated or cooled machines or components such as internal combustion engines, gear boxes, electrical machines, heat exchangers etc. that require periodical drainage and replacement of the fluid in a reservoir, but are supplied by the manufacturer with a simple drain plug threaded in an opening provided in the bottom wall of the reservoir. Removal of the drain plug to drain the fluid is thus highly subject to splashing and dirtying of the maintenance person, tools and peripheral environment. For example, a car owner changing motor oil in his driveway is subject to splashing of hot oil on his hands and tools, and possibly on the driveway surface, thus requiring extensive cleaning and possibly causing injuries to users and permanent damage to the driveway surface. Moreover, the plug being a loose part can be lost causing troubles, delays and costs since the specific replacement part can be hard to obtain. Canadian patent application No. 2,078,945 by Ackerman published in 1993 shows such a drain plug for use on motor vehicles.

A certain number of drain valve types are known in the prior art that could be installed in the threaded drain opening of the fluid reservoir to at least reduce some of the drawbacks inherent to the use of a drain plug. Such a drain valve is disclosed by Laue in U.S. Pat. No 2,474,430 issued in 1949. The valve comprises an externally and internally threaded body receiving a threaded plug provided with a handle for manual operation. Nevertheless, the handle being located on the fluid outlet path, sputtering occurs and the user's hand is contacted by the fluid. Moreover, since the plug is designed to extend into the body beyond the opening of the reservoir, the original diameter of the opening is further reduced by the addition of the wall thickness of the plug to that of the body.

In U.S. Pat. No. 3,727,638 (Zaremba—1973), U.S. Pat. No. 3,948,481 (Pollock—1976) and U.S. Pat. No. 4,025,048 (Tibbits—1977), although fluid flow is properly oriented for a clean and neat operation, effective opening size is still further reduced with respect to the original opening diameter, which dramatically increases the time required to drain all the fluid contained in the reservoir. Furthermore, the valves in Pollock and Tibbits are closed by unscrewing the knob to extend away from the bottom wall of the reservoir, creating an excessive overall profile height which causes risks of impact by obstacles along the road and potentially spillage and engine damage.

Although it is not intended for use as a drain valve fitting in a threaded opening, the nozzle disclosed in U.S. Pat. 627,073 (Cliff—1899) presents some interest. Indeed, a cap provided with a centre opening is screwed on the external threads of a body provided with semi-circular outlet ports. When the cap is unscrewed fluid escapes from the semi-circular outlets through the cap internal cavity and finally through the centre opening. When the cap is screwed, the centre opening is closed by the gasket lined solid wall portion extending between the semi-circular outlet ports of the body, thus preventing fluid spillage. Such a closure concept can be adapted to provide a low profile drain valve. However the body is not adapted to fit into a threaded hole and very significant restriction to fluid flow occurs in the body and cap outlet ports. In addition, seal mounting is not appropriate to facilitate periodic replacement and to limit compression. Furthermore manufacturing is expensive since it requires metal casting and complex and extensive machining.

There is thus a need for a low-profile low-restriction drain valve that can fit into an existing threaded drain opening of a fluid reservoir to replace a plug and provide a neat fluid stream and avoid sputtering and contacting with hands and tools.

OBJECT OF THE INVENTION

An object of the present invention is therefor to provide a drain valve which overcomes the limitations and drawbacks of the above mentioned solutions of the prior art.

SUMMARY OF THE INVENTION

More specifically, in accordance with the invention as broadly claimed, there is provided a drain valve for use with a fluid reservoir having a drain opening, comprising a valve body, a cap and a at least one perforation-sealing member. The valve body has a tubular shank for installation in the drain opening and defining a fluid ingress, and a tubular head portion generally coaxial with the tubular shank and defining a chamber in communication with the fluid ingress and having a cross sectional area larger than a cross sectional area of the fluid ingress. The valve body also comprises an inner transverse wall extending across the chamber and having at least one fluid flow perforation, and a distal end opposite to the shank. The cap is movably assembled to the distal end of the tubular head portion between open and closed positions. This cap defines a fluid egress which, in the open position of the cap, is in communication with the above mentioned at least one perforation to permit draining of fluid from the reservoir. The perforation-sealing member is interposed between the cap and the tubular head portion and, in the closed position of the cap, seals the above mentioned at least one perforation to prevent draining of fluid from the reservoir.

Preferably, to prevent restriction to the fluid flow caused by the drain valve, the above mentioned at least one perforation has a cross sectional area substantially equal to or larger than a cross sectional area of the fluid ingress, and the fluid egress has a cross sectional area substantially equal to or larger than the cross sectional area of the at least one perforation.

In accordance with other preferred embodiments of the drain valve:

the drain opening is threaded, the tubular shank is externally threaded for screwing into the threaded drain opening, and the tubular head portion comprises external flank faces for tightening or loosening the externally threaded tubular shank in the threaded drain opening by means of a tool;

the drain valve further comprises an annular seal member interposed between an outer surface of the tubular head portion and an outer surface of the fluid reservoir, this annular seal member being compressed between these outer surfaces of the tubular head portion and the fluid reservoir when the externally threaded tubular shank is tightened in the threaded drain opening;

the drain fluid ingress enlarges into the chamber through a frusto-conical wall section;

the drain valve is a low-profile low-restriction drain valve, the inner transverse wall is located at the distal end of the tubular head portion, the at least one perforation of the inner transverse wall comprises a set of peripherally distributed perforations, the tubular head portion is cylindrical and externally threaded, the cap comprises an internally threaded cylindrical section screwed onto the cylindrical externally threaded tubular head portion and an annular inward flange at a distal end of the internally threaded cylindrical section, and the at least one perforation sealing member is annular and interposed between the annular inward flange and a peripheral portion of the inner transverse wall in which the peripherally distributed perforations are made;

the tubular head portion is externally threaded but comprises proximal, external tool-engaging flank faces;

the tubular head portion is externally threaded and comprises external tool-engaging flank faces made in the external threaded surface of the tubular head portion, and the externally threaded tubular head section comprises a distal, external threaded border with no tool-engaging flank faces;

the drain valve is a low-profile low-restriction drain valve; the inner transverse wall is located in the chamber remote from the distal end of the tubular head portion; the tubular head portion is cylindrical, internally threaded, and comprises a distal annular edge surface; the cap is cylindrical, externally threaded and screwed in the internally threaded tubular head portion; the at least one perforation of the inner transverse wall comprises a set of peripherally distributed perforations; the externally threaded cap comprises a proximal externally threaded cap section, a distal unthreaded cap section, an external annular shoulder between the proximal externally threaded cap section and the distal unthreaded cap section, and a proximal annular edge surface; and the at least one perforation-sealing member comprises a first annular seal member between the external annular shoulder of the externally threaded cap and the distal annular edge surface of the tubular head portion, and a second seal member between the proximal annular edge surface of the externally threaded cap and the inner transverse wall;

to avoid back pressure, the fluid egress has a cross sectional area larger than a cross sectional area of the at least one perforation;

the chamber, the at least one perforation and the fluid egress have respective cross sectional areas which create a Venturi effect within the drain valve when the cap is in its open position;

the at least one perforation of the inner transverse wall comprises a set of peripherally distributed perforations;

the cap comprises: a bottom surface with a diameter which is large with respect to a diameter of the egress, this egress opening through the bottom surface of the cap; and a cylindrical section with external tool-engaging flank faces sufficiently distant from the fluid egress as to prevent a fluid stream from contacting a tool or a user's hand;

the fluid egress comprises means for receiving a drain tube;

the at least one perforation has cross sectional area which is less than 50% of a total area of the inner transverse wall; and the drain valve further comprises abutment faces controlling compression of the at least one perforation-sealing member.

The above and other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 2b is a bottom view of the low-profile low-restriction drain valve of FIG. 2a;

DETAILED DESCRIPTION OF THE PREFERRED EMBODIMENTS

Figure 1:
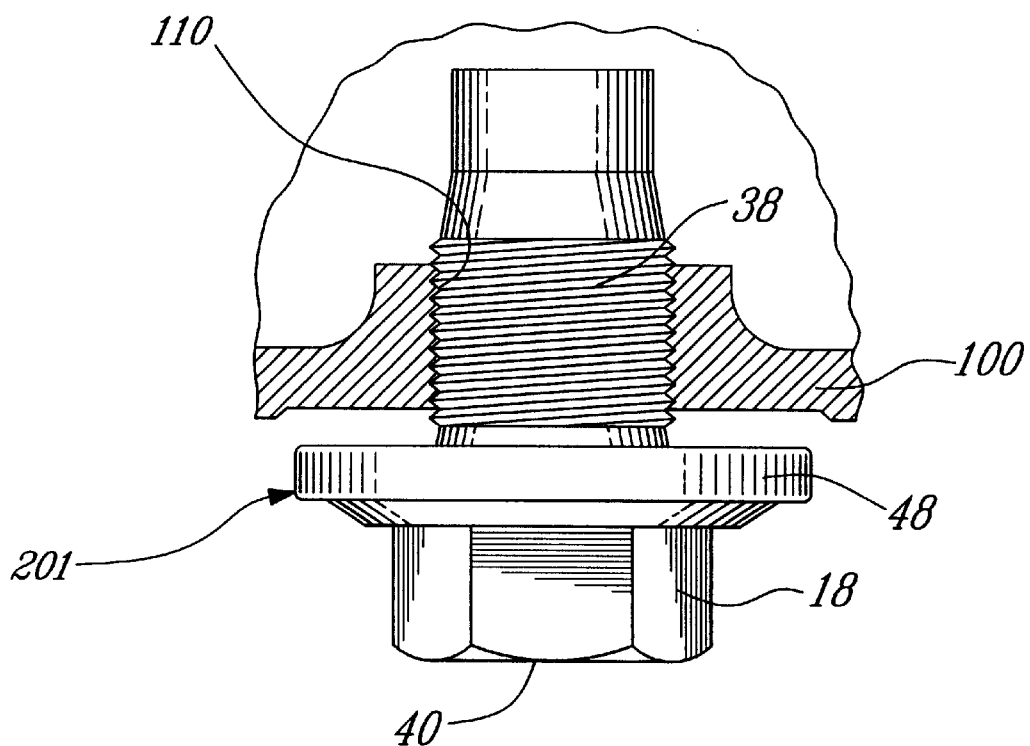
FIG. 1 is a front elevation view of a prior art drain plug mounted in a threaded drain opening in the bottom wall of a fluid reservoir such as a crankcase.

The preferred embodiments of the low-profile low-restriction drain valve according to the present invention will now be described in detail referring to the appended drawings. In the different figures of the appended drawings, the corresponding parts are identified by the same reference numerals.

FIG. 1 of the appended drawings illustrates a prior art drain plug 201 installed in a threaded drain opening 110 in the bottom wall 100 of an oil pan. The drain plug 201 comprises a threaded shank 38 and a hexagonal head 40 formed with tool-engaging flank faces such as 18. The prior drain plug 201 of FIG. 1 further comprises an elastomeric annular washer seal member 48 to provide for fluid-tight sealing of the drain opening 110. To drain the oil from the oil pan, the plug 201 must be completely removed using a tool such as a key, an adjustable wrench or a socket with a ratchet handle. As stated above, undesirable sputtering of the fluid and contact thereof with hands and tools are produced during removal of such a plug 201. However, the head 40 of the plug 201 has a low profile outside of the oil pan and, accordingly, is unlikely to be impacted by objects along the road. Also, existing drain valves would extend too much from the bottom wall 100 of the oil pan, thus causing risks of impact and damage and, potentially, the accompanying engine failure. Moreover, replacing the plug 201 with an existing prior art drain valve in the drain opening 110 would reduce the effective opening size to such an extent that draining of the fluid would require a much increased time delay.

Figure 2A:
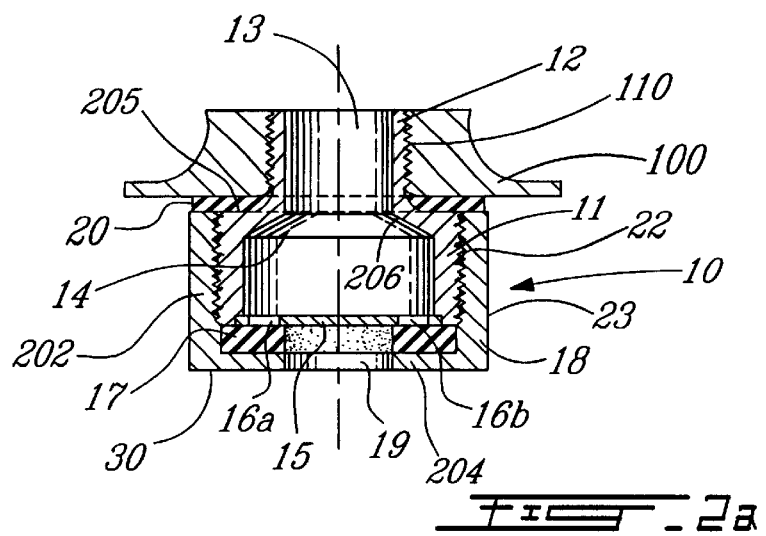
FIG. 2a is a cross-sectional elevation view of a first preferred embodiment of low-profile low-restriction drain valve in accordance with the present invention, mounted in a threaded drain opening in the bottom wall of a fluid reservoir and shown in a fluid-tight closed position.
Figure 2B:
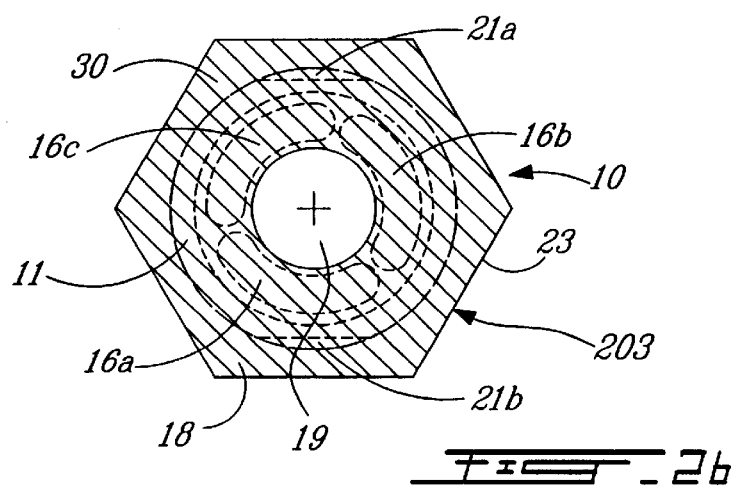
Figure 3:
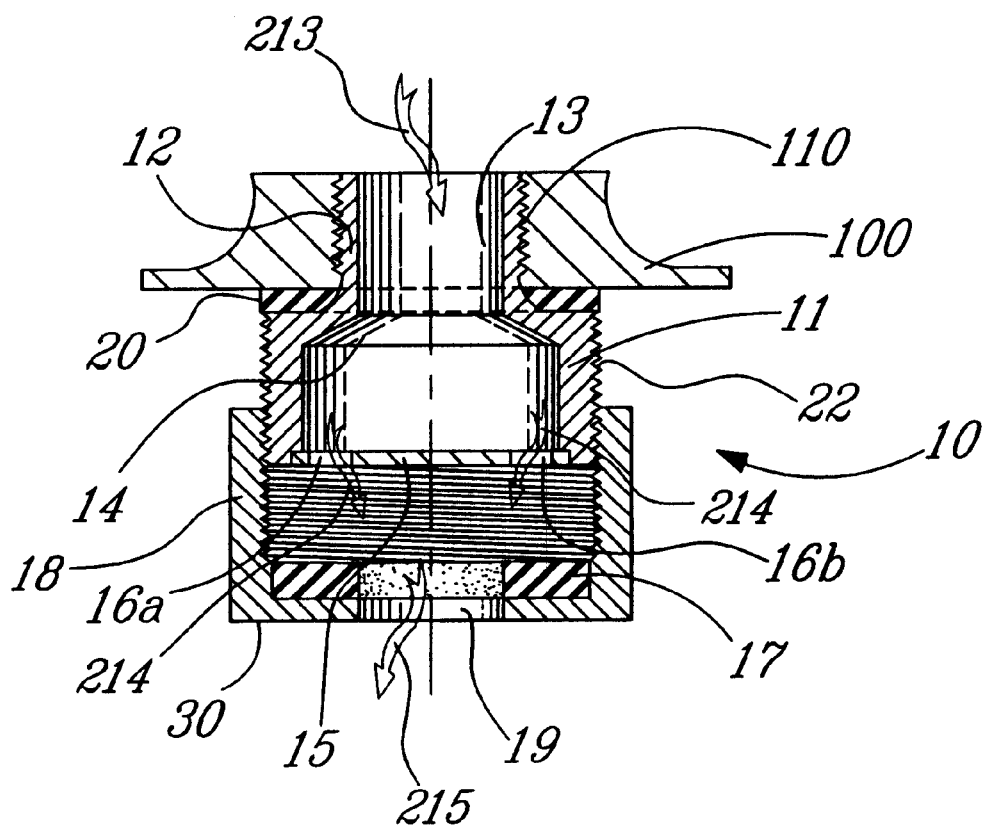
FIG. 3 is a cross-sectional elevation view of the low-profile low-restriction drain valve of FIGS. 1, 2a, 2b and 2c, shown in an open, fluid-draining position.

Therefore, to overcome the above described drawbacks of the prior art, the present invention provides a drain valve 10 illustrated in FIGS. 2a, 2b and 3. Drain valve 10 comprises a valve body 11 provided with a cylindrical threaded shank 12 adapted to fit into the existing threaded drain opening 110 in the bottom wall 100 of the fluid reservoir such as an oil pan. More specifically, the cylindrical threaded shank 12 is screwed into the threaded drain opening 110 in the same manner as the shank 38 of plug 201. Valve body 11 also comprises an externally threaded, cylindrical and coaxial head portion 22 to receive a cap 18. The head portion 22 of body 11 is nevertheless provided with a pair of diametrically opposite, outer tool-engaging flank faces 21a and 21b to enable screwing of shank 12 into the drain opening 110.

The cylindrical shank 12 defines a cylindrical fluid ingress 13 which enlarges through a frusto-conical wall section 206 to form a downstream chamber 14 in the head portion 22. This downstream chamber 14 is delimited by an inner transverse perforated circular wall 15 on the side opposite to the shank 12. This circular wall 15 is provided with, for example, three peripheral elongated and arcuate perforations 16a, 16b and 16c through which the fluid contained in the reservoir can be drained when the drain valve 10 is in the open position as shown in FIG. 3. Of course, it is within the scope of the present invention to use such perforations having various shapes, dimensions and positions.

The drain valve 10 further comprises a cap 18 formed with internally threaded cylindrical section 202 having an outer hexagonal surface 203. The cap 18 is also formed at one end thereof with an annular, generally flat inward flange 204. The opening in the center of the annular flange 204 defines a cylindrical fluid egress 19.

In the closed position of the drain valve 10 as shown in FIG. 2a, the internally threaded cylindrical section 202 of the cap 18 is screwed and tightened onto the externally threaded head portion 22. An elastomeric flat annular washer-like seal member 17 is pressed between the annular flange 204 and the wall 100 to ensure fluid-tight sealing between the perforations 16a, 16b and 16c and the fluid egress 19. The outer hexagonal surface 203 of the cap 18 defines tool-engaging flank faces such as 23 to enable a user to screw and unscrew the cap 18 on the head portion 22 between a closed sealed position and an open fluid draining position.

Also, just a word to mention that fluid-tight sealing between drain opening 110, wall 100 and shoulder 205 between head portion 22 and shank 12 is provided by an elastomeric annular washer-like seal member 20 compressed between shoulder 205 and wall 100 upon tightening the shank 12 in the drain opening 110. The structure, material and physical properties of the seal member 20 are advantageously selected to produce, for a given tightening torque of the valve body 11 in the drain opening 110 and of the cap 18 on the head portion 22, a friction which will prevent, upon unscrewing cap 18, unscrewing of the valve shank 12 from the drain opening 110.

Referring to FIG. 2a, the perforated wall 15 is made from flat sheet material preferably by stamping and is assembled into the mouth of chamber 14. For that purpose, a press-fit assembly can be used or adhesive or welding (for example brazing) can be considered. Such a manufacturing technique provides the necessary funnel like internal volume at low cost. However, one of ordinary skill in the art of manufacturing methods can contemplate alternate techniques such as investment casting to provide a single part valve body with acceptable results. It shall be mentioned that the shape of the internal cavity is not critical as long as the cross sectional area increases to the required value in the downstream flow direction.

In operation, when the drain valve 10 is set from the closed fluid-tight position of FIG. 2a to the open fluid-draining position of FIG. 3, fluid flows through the ingress 13 (arrow 213 of FIG. 3) to fill cavity 14. Flow of the fluid continues through the perforations 16a, 16b and 16c and the inside of the cap 18 (arrows 214 of FIG. 3) to finally reach the egress 19 (arrow 215 of FIG. 3).

Figure 2C:
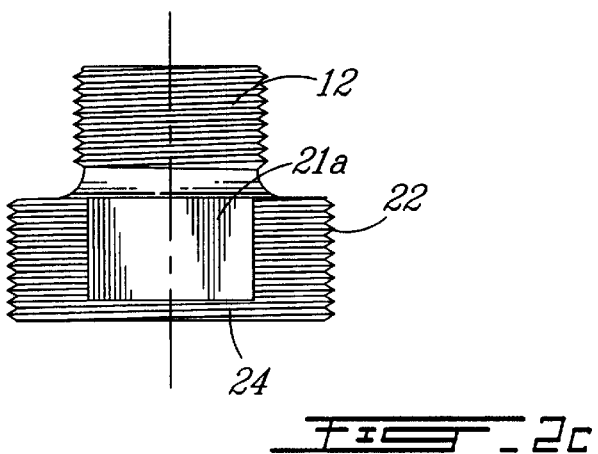
FIG. 2c is an elevation view of a valve body of the low-profile low-restriction drain valve of FIGS. 1, 2a and 2b, showing one of two diametrically opposite tool-engaging surfaces of a head portion of the valve body.

With the drain valve 10 according to the present invention, sputtering is avoided since the drain valve fluid egress 19 is emerging from the major face 30 of the large diameter cap 18, while it is operated by contact with the external flank faces such as 23, above and sufficiently far from egress 19 to prevent the fluid stream from contacting the tool or the user's hand. Optionally, fluid egress 19 of cap 18 can be provided with internal threads or the cap 18 provided with external threads or an external nipple for attachment of a flexible drain tubing facilitating sputtering-free fluid draining into a distal vessel. An other optional feature of the drain valve 10 is to leave a border of full diameter threaded material 24 (FIG. 2c) at the lower end of the head portion 22 of the valve body 11 to prevent possible upward fluid backflow between the tool-engaging faces 21a and 21b, and the inner threaded surface of the cylindrical section 202 of the cap 18.

It is also worth mentioning that the above described structure of the drain valve 10 is especially designed to provide minimal restriction to fluid flow, since it is destined to be installed into an existing drain opening 110 of a given flow capacity. Indeed, valve body 11 is preferably made from high strength metal, such as steel and stainless steel, so that the wall thickness of shank 12 can be made thin with respect to the diameter of the drain opening but still capable of withstanding the tightening stress without damage. Also, no other part is co-axially assembled into the fluid ingress 13, leaving a maximal, effective fluid flow area. Moreover the perforations 16a, 16b and 16c are dimensioned to occupy less than 50% of the area of the perforated wall 15, while the latter area is set to such a value that the total area of the perforations 16a, 16b and 16c is substantially equal to or larger than the cross sectional area of the ingress 13. Typically, as shown in FIGS. 2a and 2b, that total area as well as the cross sectional area of the egress 19 is set to approximately the same cross sectional area as the original drain opening 110. The cross sectional area of the egress 19 is set to a value substantially equal to but preferably slightly larger than the total area of the three perforations 16a, 16b and 16c to avoid any back pressure that could lead to some leakage between the cap 18 and the threaded head portion 22 of the valve body 11. To avoid such leakage, appropriate dimensioning of the various cross sectional areas can actually create a depression by Venturi effect.

Another important feature of the drain valve of the present invention is its extremely low axial (vertical in FIG. 2a and 3) profile. This is critical to limit the risks of impact and damage when the drain valve is installed, for example, under a motor vehicle. A drain valve extending too much from the outer surface of wall 100 increases the risk of accidental impact, which can result in fluid leakage and lead to costly damage to a fluid lubricated machine. The drain valve according to the preferred embodiment of the present invention has approximately the same overall external height as the prior art plug 201 illustrated in FIG. 1, i.e. less than 0.625 inch including the seal member 20. In the preferred embodiment of the drain valve, maximal lowering of the overall axial profile is accomplished by overlapping the cap 18 to the external, threaded head portion 22 of the valve body 11, and by superimposing the tool-engaging faces 21*a* and 21*b* to the threaded head portion 22 receiving the cap 18.

Figure 4:
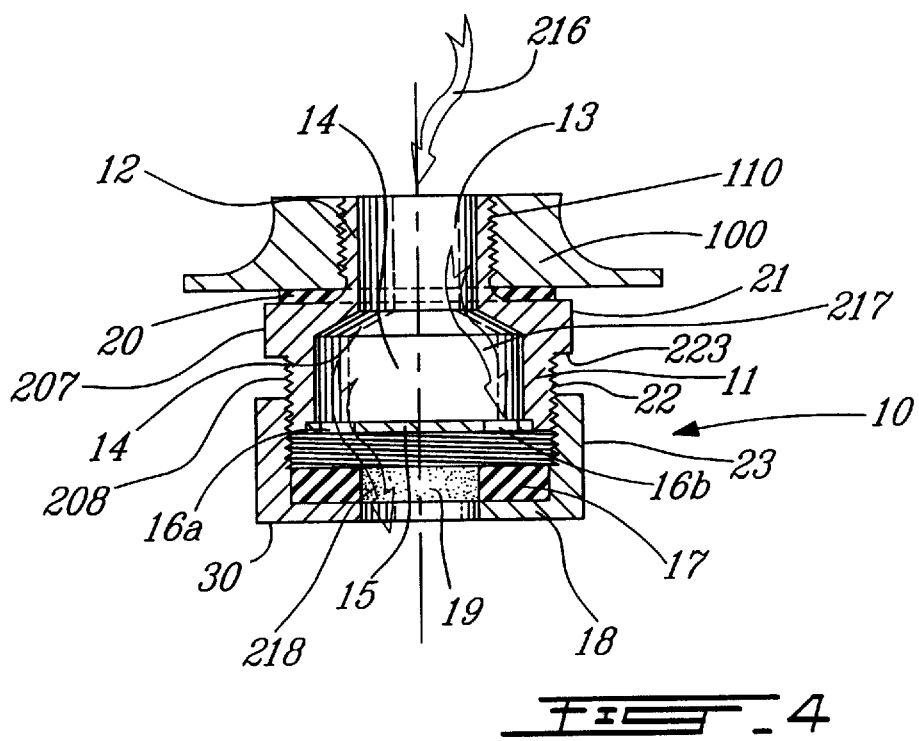
FIG. 4 is a cross-sectional elevation view of a second preferred embodiment of the low-profile low-restriction drain valve of the present invention, shown in an open, fluid-draining position.

FIG. 4 shows a second preferred embodiment of the low-profile low-restriction drain valve 10 according to the present invention. In this preferred embodiment, the valve body 11 has a head portion 22 with a distal, shorter external threaded section 208 but with external tool engaging flank faces forming a proximal hexagonal perimeter 207 extending beyond threaded section 208. Such an arrangement provides the possibility of using a wider selection of fastening tools to screw the valve body 11 in the drain opening 110. Also, an annular shoulder 223 between the proximal hexagonal perimeter 207 and the distal external threaded section 208 provides positive stop to limit screwing of the cap 18 and thereby control compression deformation of the washer-like seal member 17 to a predetermined value (for example 25%). This extends the lifetime of the seal member 17 while ensuring adequate sealing. Also, this arrangement is slightly cheaper to manufacture in comparison to the embodiment of FIGS. 2*a*, 2*b*, 2*c* and 3. However, such a modification causes some increase (about 0.125 in.) of height of the overall axial valve profile. The rest of the valve remains unchanged and the valve operates exactly the same way.

In operation, when the drain valve 10 is set to the open fluid-draining position of FIG. 4, fluid flows through the ingress 13 (arrow 216) to fill cavity 14 (arrow 21). Flow of the fluid continues through the perforations 16*a*, 16*b* and 16*c* and the inside of the cap 18 to finally reach the egress 19 (arrow 218 of FIG. 4).

Figure 5:
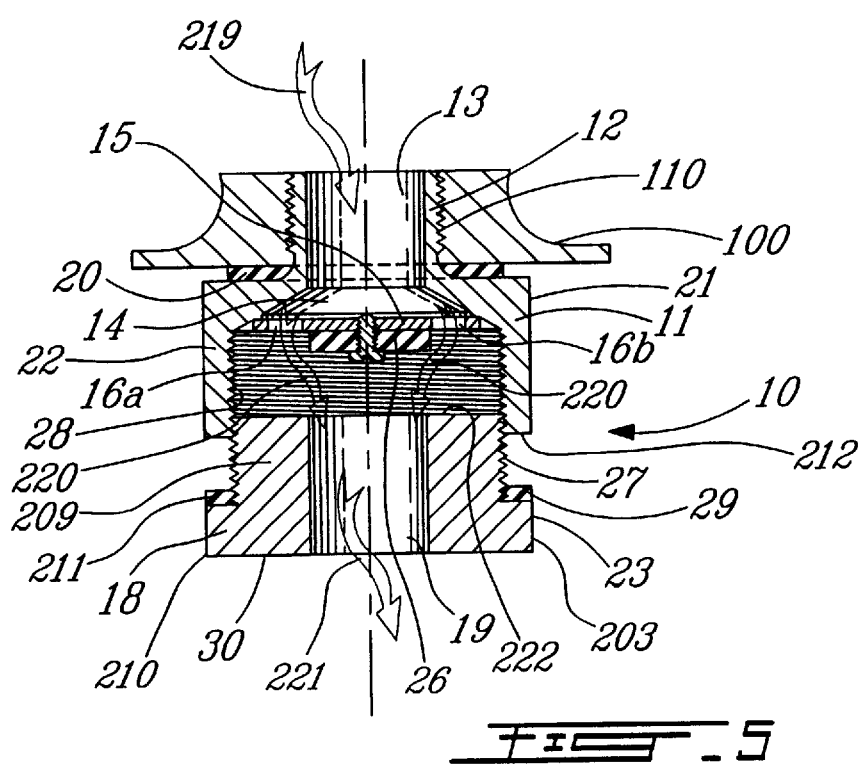
FIG. 5 is a cross-sectional elevation view of a third preferred embodiment of the low-profile low-restriction drain valve of the present invention, shown in an open, fluid-tight position.

FIG. 5 illustrates a third preferred embodiment of the low-profile, low-restriction drain valve 10. In the arrangement of FIG. 5, the cap 18 is tubular and comprises a proximal externally threaded major cap section 209, a distal short and unthreaded thicker cap section 210, and an external annular right angle shoulder 211 between proximal and distal sections 209 and 210. The distal cap section 210 bears the tool-engaging flank faces 23 of the outer hexagonal surface 203. An elastomeric, annular washer-like seal member 29 is located on the shoulder 211 for compression between this shoulder 211 and an annular distal edge surface 212 of tubular head portion 22 in order to fluid-tight seal the space between the edge surface 212 and the shoulder 211. In this case, the head portion 22 is internally threaded to receive the externally threaded section 209 of cap 23.

The preferred embodiment of FIG. 5 also features an alternate method of sealing fluid egress 19 in a closed fluid-tight position (not shown). As illustrated, an elastomeric, small-diameter circular seal member 26 is fastened centrally of the outer face of the peripherally perforated wall 15 through a fastener such as screw 25. This seal 26 will produce a fluid-tight joint between the perforations 16*a*, 16*b* and 16*c* and the egress 19. More specifically, a proximal annular edge surface 222 of the cap 18 will apply to the seal 26 to form a fluid-tight joint between this proximal annular edge surface 222 and the central portion of wall 15. In the embodiment of FIG. 5, it can be seen that the perforated wall 15 is mounted at the end of larger diameter of the frusto-conical wall section 206 of the chamber 14.

In operation, when the drain valve 10 is set to the open fluid-draining position of FIG. 5, fluid flows through the ingress 13 (arrow 219). Flow of the fluid continues through the perforations 16*a*, 16*b* and 16*c* to fill the inside of the head portion 22 (arrows 220) to finally reach the egress 19 (arrow 221).

The concept of FIG. 5 presents the drawback of increasing the height of the axial valve profile, which can reach almost one inch. Also, the cap 18, which is destined to be manipulated more frequently than the valve body 11 has the smaller tool engaging surface 203, which is not the best option. However, the embodiment of FIG. 5 is fully operational and still represents an advantageous alternative to prior art drain plugs in most applications.

The drain valve according to the present invention presents, amongst others, the following advantages:

The drain valve has a low profile and low restriction and fits into a drain opening of a fluid reservoir to provide a neat fluid stream and avoid sputtering and contacting with hands and tools;

The drain valve fits into an existing drain opening of a fluid reservoir in lieu of a drain plug, while providing minimal reduction of the effective opening area and restriction of fluid flow with respect to the original opening;

The drain valve permits a user to drain only in part the fluid contained in a reservoir and then shut-off the valve without causing sputtering;

The drain valve features low overall height to reduce the risks of impact by obstacles on the road when installed on a vehicle;

The cost of manufacturing the drain valve is low; and

The drain valve reduces the risk of losing a part when the fluid starts flowing.

Therefore, it can be seen that the low-profile low-restriction drain valve according to the present invention can be advantageously used to replace a drain plug in a drain opening of a fluid reservoir such as an oil pan, to permit a cleaner fluid draining operation, without significant drawback on draining time and exposition to external impacts.

Various modifications may be made without departing from the spirit and scope of the present invention. For example:

the materials and manufacturing processes can be modified according to availability and costs;

the number and shape of the perforations in the perforated wall of the valve body can be changed;

equivalent benefits would result from using the drain valve in a generally horizontal orientation on a generally vertical wall of a reservoir;

the shank can be assembled to the drain opening using a permanent or quick-disconnect type of assembly; and the cap can be assembled internally of the head portion using for example a twist-lock or spring biased type of closure assembly;

etc.

Although the present invention has been described hereinabove by way of preferred embodiments thereof, it can be modified at will within the scope of the appended claims, without departing from the spirit and nature of the subject invention.

What is claimed is:

1. A drain valve for use with a fluid reservoir having a drain opening, comprising:

a valve body having:

a tubular shank for installation in the drain opening, said tubular shank defining a fluid ingress; and a tubular head portion generally coaxial with the tubular shank, defining a chamber in communication with the fluid ingress and having a cross sectional area larger than a cross sectional area of said fluid ingress, and comprising:

an inner transverse wall extending across the chamber and comprising at least one fluid flow perforation; and a distal end opposite to the shank;

a cap movably assembled to the distal end of the tubular head portion between open and closed positions, said cap defining a fluid egress which, in the open position of the cap, is in communication with said at least one perforation to permit draining of fluid from the reservoir; and at least one perforation-sealing member interposed between the cap and the tubular head portion and which, in the closed position of the cap, seals said at least one perforation to prevent draining of fluid from the reservoir.

2. A drain valve as recited in claim 1, wherein:

said at least one perforation has a cross sectional area substantially equal to or larger than a cross sectional area of the fluid ingress; and the fluid egress has a cross sectional area substantially equal to or larger than the cross sectional area of said at least one perforation.

3. A drain valve as recited in claim 1, wherein the drain opening is threaded, the tubular shank is externally threaded for screwing into the threaded drain opening, and the tubular head portion comprises external flank faces for tightening or loosening the externally threaded tubular shank in the threaded drain opening by means of a tool.

4. A drain valve as recited in claim 3, further comprising an annular seal member interposed between an outer surface of the tubular head portion and an outer surface of the fluid reservoir, said annular seal member being compressed between said outer surfaces of the tubular head portion and the fluid reservoir when said externally threaded tubular shank is tightened in the threaded drain opening.

5. A drain valve as recited in claim 1, wherein the drain fluid ingress enlarges into said chamber through a frusto-conical wall section.

6. A drain valve as recited in claim 1, wherein:

the drain valve is a low-profile low-restriction drain valve;

the inner transverse wall is located at the distal end of the tubular head portion; and said at least one perforation of the inner transverse wall comprises a set of peripherally distributed perforations.

7. A drain valve as recited in claim 6, wherein:

the tubular head portion is cylindrical and externally threaded;

said cap comprises an internally threaded cylindrical section screwed onto the cylindrical, externally threaded tubular head portion, and an annular inward flange at a distal end of the internally threaded cylindrical section; and said at least one perforation sealing member is annular and interposed between the annular inward flange and a peripheral portion of the inner transverse wall in which the peripherally distributed perforations are made.

8. A drain valve as recited in claim 1, wherein the tubular head portion is externally threaded but comprises proximal, external tool-engaging flank faces.

9. A drain valve as recited in claim 1, wherein the tubular head portion is externally threaded and comprises external tool-engaging flank faces made in the external threaded surface of the tubular head portion.

10. A drain valve as recited in claim 9, wherein the externally threaded tubular head section comprises a distal, external threaded border with no tool-engaging flank faces.

11. A drain valve as recited in claim 1, wherein:

the drain valve is a low-profile low-restriction drain valve;

the inner transverse wall is located in the chamber remote from the distal end of the tubular head portion;

the tubular head portion is cylindrical, internally threaded, and comprises a distal annular edge surface; and the cap is cylindrical, externally threaded and screwed in the internally threaded tubular head portion.

12. A drain valve as recited in claim 11, wherein:

said at least one perforation of the inner transverse wall comprises a set of peripherally distributed perforations;

the externally threaded cap comprises:

a proximal externally threaded cap section;

a distal unthreaded cap section;

an external annular shoulder between the proximal externally threaded cap section and the distal unthreaded cap section; and a proximal annular edge surface; and said at least one perforation-sealing member comprises:

a first annular seal member between the external annular shoulder of the externally threaded cap and the distal annular edge surface of the tubular head portion; and a second seal member between the proximal annular edge surface of the externally threaded cap and the inner transverse wall.

13. A drain valve as recited in claim 1, wherein, to avoid back pressure, the fluid egress has a cross sectional area larger than a cross sectional area of said at least one perforation.

14. A drain valve as recited in claim 1, wherein the chamber, said at least one perforation and the fluid egress have respective cross sectional areas which create a Venturi effect within said drain valve when the cap is in said open position.

15. A drain valve as recited in claim 1, wherein said at least one perforation of the inner transverse wall comprises a set of peripherally distributed perforations.

16. A drain valve as recited in claim 1, wherein the cap comprises:

a bottom surface with a diameter which is large with respect to a diameter of the egress, said egress opening through said bottom surface of the cap; and a cylindrical section with external tool-engaging flank faces sufficiently distant from the fluid egress as to prevent a fluid stream from contacting a tool or a user's hand.

17. A drain valve as recited in claim 1, wherein the fluid egress comprises means for receiving a drain tube.

18. A drain valve as recited in claim 2, wherein said at least one perforation has cross sectional area which is less than 50% of a total area of the inner transverse wall.

19. A drain valve as recited in claim 1, further comprising abutment faces controlling compression of said at least one perforation-sealing member.

* * * * *